US00RE35268E

United States Patent [19]

Frolov et al.

[11] E Patent Number: Re. 35,268

[45] Reissued Date of Patent: Jun. 11, 1996

[54] DOOR SECURITY SYSTEM

[75] Inventors: George Frolov, Farmington; Gary Lavelle, Avon; James J. Scott, New Britain, all of Conn.

[73] Assignee: Harrow Products, Inc., Grand Rapids, Mich.

[21] Appl. No.: 148,845

[22] Filed: Nov. 8, 1993

Related U.S. Patent Documents

Reissue of:

[64] Patent No.: 5,065,136
Issued: Nov. 12, 1991
Appl. No.: 615,128
Filed: Nov. 19, 1990

[51] Int. Cl.[6] ..... E05C 17/56

[52] U.S. Cl. ..... 340/545; 292/251.5

[58] Field of Search ..... 340/545, 546, 340/547, 550; 292/251.5; 70/91, 92, 276, 277

[56] References Cited

U.S. PATENT DOCUMENTS

| | | | |
|---|---|---|---|
| 4,100,581 | 7/1978 | Slack | 340/545 |
| 4,720,128 | 1/1988 | Logan, Jr. | 292/251.5 |
| 4,785,286 | 11/1988 | Martin | 340/545 |
| 4,803,482 | 2/1989 | Verslycken | 70/92 |
| 4,893,852 | 1/1990 | Harris | 292/251.5 |

*Primary Examiner*—Hezron E. Williams
*Assistant Examiner*—Christine K. Oda
*Attorney, Agent, or Firm*—Chilton, Alix & Van Kirk

[57] ABSTRACT

An exit door security system which employs an electromagnet and armature to lock an exit door comprises an electromagnetic housing and a frame assembly. The housing is pivotally mounted to the frame assembly. An attempt to exit the door causes the housing to pivot to thereby actuate a switch. The lock is automatically released after a pre-established time delay. An alarm at the door may also be actuated by the switch. The electronic circuitry is configured to allow for immediate authorized egress and to implement an immediate safety release of the lock. The lock may be operated in either a normally locked or normally unlocked mode.

52 Claims, 9 Drawing Sheets

DOOR SECURITY SYSTEM

Matter enclosed in heavy brackets [ ] appears in the original patent but forms no part of this reissue specification; matter printed in italics indicates the additions made by reissue.

BACKGROUND OF THE INVENTION

This invention relates generally to electromagnetic locks which are employed in connection with doors for controlling egress and/or access through the door. More particularly, the present invention relates to electromagnetic lock systems which are adapted to provide for delayed egress through an exit door and/or a security alarm for monitoring egress.

Electromagnetic locks have been employed for a number of exit door/emergency door applications so as to provide an effective and reliable means for locking the door while also permitting egress through the door in emergency situations. A number of electromagnetic lock systems have incorporated a time delay implemented by various devices. The time delay systems effectively delay unlocking of the electromagnetic lock for a pre-established time interval, such as 15 or 30 seconds, to enhance security and control egress from a secured enclosure. A number of electromagnetic lock systems have also incorporated various devices for activating an alarm when an attempt is made to egress through the associated exit or emergency door. In addition, a number of electromagnetic lock systems incorporate devices for releasing time electromagnetic lock in case of fire or other emergency conditions.

Emanual L. Logan, Jr. et al, U.S. Pat. No. 4,720,128 discloses an electromagnetic emergency exit door lock implementing a time delay for egress through a doorway. A switch is mounted adjacent to the electromagnet and the switch is operated by a switch operator mounted on the door. The switch provides a signal which indicates that an attempt is being made to open the door. The signal is used to sound an alarm or start a time delay release of the electromagnetic lock. The switch comprises a plunger, a magnet and a hall cell which are located within a compartment disposed beside the electromagnetic. When the door is closed and locked, a striker on the door engages the plunger of the switch. When a person in the enclosure presses either a panic bar or the inside surface of the door so as to force the door to move slightly, the plunger moves to displace a magnet from the hall cell and generate a signal indicating someone is attempting to leave the enclosure.

Additional electromagnetic lock systems to which the invention relates are set forth by patentee and U.S. Pat. Nos. in the Table below.

| Patentee | U.S. Pat. No. |
|---|---|
| Frolov | 4,957,316 |
| McFadden | 4,487,439 |
| Logan | 4,324,425 |
| Logan | 4,257,631 |

SUMMARY OF THE INVENTION

Briefly stated, the invention in a preferred form is an electromagnetic lock in which the electromagnetic lock assembly is pivotably mounted to a frame or bracket assembly secured to the door frame. The armature is mounted to the door by means of a mounting arrangement which allows limited pivotal movement of the armature. A switch is mounted to the electromagnetic lock assembly so as to be actuated by pivotal or rocking motion of the electromagnetic lock assembly upon attempting to open the door. The switch generates a signal which may be employed in connection with an instant or a time delay release for the electromagnetic lock and/or an alarm to alert that an attempt is being made to egress through the door and/or for other functions.

The pivotal mounting is provided by a pair of coaxial pivot pins having a pivot axis which is substantially coplanar with the attraction surface of the electromagnet. The pivot axis is spaced from the center of gravity of the housing. The frame assembly is mounted to the door frame so that the pivot axis is substantially horizontal and the housing is pivotal about the axis in a generally upward and downward direction. The frame has a bottom plate which engages the bottom of the housing to restrict the downward pivotal movement of the housing. In addition, adjustable stop pins are mounted to the housing and engageable against base plate of the frame to restrict upper pivotal movement of the housing.

Delay circuitry is mounted in the housing and is responsive to the signal from the switch for deactivating the electromagnet after a pre-established time interval. An audio alarm is also sounded at the housing. A keyway is disposed in the housing and rotatable to a first position for terminating activation of the alarm. The keyway may be rotatable to a second position for deactivating the electromagnet to allow for egress through the door. In the event of an emergency, the circuitry also includes an override for automatically terminating power to the electromagnet.

In one embodiment of the invention, a discriminator is provided for discriminating between door movement resulting from an internal force applied on one side of the door and an external force applied on the other side of the door. The discriminator generates a signal which is processed for selectively deactivating the electromagnet. The discriminator may comprise a passive infrared sensor. An auxiliary switch which is actuatable in response to an attempt to open the door is processed in series with the first signal from the rocking switch. A legal entry override is also selectively activatable to simultaneously deactivate the electromagnet. A key pad or a card reader may be employed as an input terminal for the legal entry override.

In other embodiments of the invention, the circuitry is constructed to provide for either a normal activated magnetic bonding mode of the electromagnet or a normal unactivated bonding mode of the electromagnet. A sensor which may sense either a magnetic element, an electromagnetic element or a selected radio frequency is employed in the vicinity of the housing for transforming the electromagnet to the activated bonding mode.

During the time delay interval, an LED mounted at the housing is pulsed by an oscillator, and a recorded message is transmitted from the housing to signal that the lock is subject to a time delay before release. The LED is transformed to a steady state after the termination of the time delay. In addition, an audio alarm may be pulsed during the time delay interval.

An object of the invention is to provide a new and improved door security system which employs an electromagnetic lock incorporating an efficient means for releasing the lock for egress.

Another object of the invention is to provide a new and improved door security system which is easy to install and operates in a highly reliable manner to secure and release exit doors.

A further object of the invention is to provide a new and improved door security system which employs an efficient and reliable means for implementing a time delay to release of the electromagnetic lock and/or an alarm indicating that an egress is being attempted.

Other objects and advantages of the invention will become apparent from the drawings and the specification.

DETAILED DESCRIPTION OF THE PREFERRED EMBODIMENT

Figure 1:
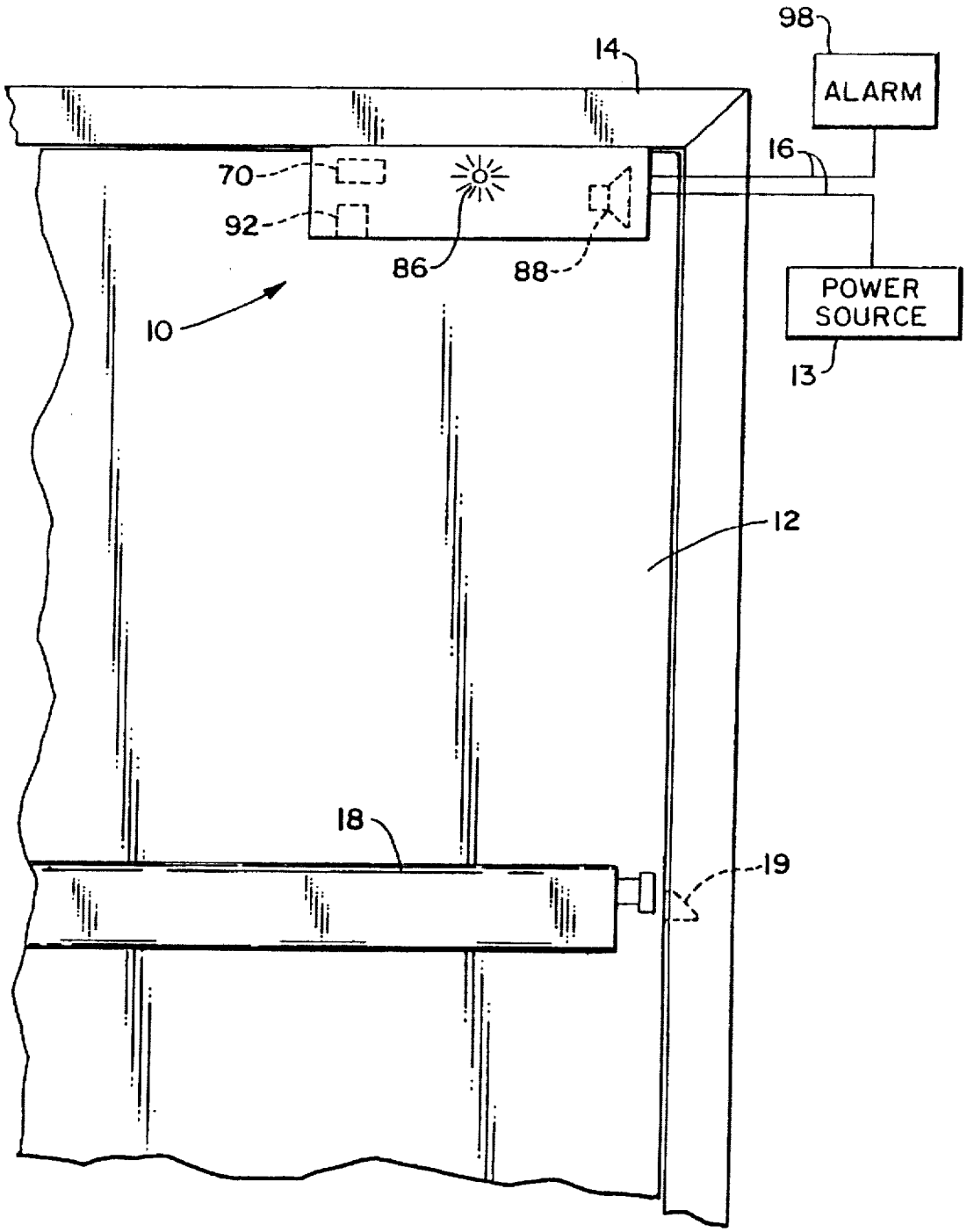
FIG. 1 is a schematic view of the door security system in accordance with the invention illustrated in conjunction with a door frame and an exit door and a latch mechanism therefor.

With reference to the drawings wherein like numerals represent like parts throughout the figures, a door security system in accordance with the present invention is generally designated by the numeral 10. In the preferred application, security system 10 is positioned in connection with an exit door 12 and a door frame 14 for controlling egress through the exit door and for selectively electromagnetically locking the exit door to prevent delay or control entry from the exit side of the door (left side in FIGS. 2 and 3) The door security system 10 has a wide range of applications and features and is not limited to application in connection with an exit door.

The security system 10 is mounted at the top portion of the door and the upper underside of the door frame. The security system 10 communicates with the power input and other system components via wires of a cable 16 which extend in the door frame as will be detailed below. The door security system is employed in connection with a panic bar or push bar 18 which releases a door latch 19 or with any other conventional latching mechanism of the door. Alternately, the door security system may be employed without any latching device.

The door security system 10 comprises an electromagnet assembly 20 which preferably mounts at an upper underside portion of the door frame 14 and an armature assembly 30 which preferably mounts to the door 12. The electromagnet assembly 20 generates a magnetic field which bonds with the armature assembly 30 to lock the door with the door frame as will be detailed below. The electromagnet assembly comprises a bracket frame 22 which receives and pivotally mounts a rectangular housing 24. The housing 24 mounts the electromagnet 26 and various other controls and components as will be detailed below.

The bracket frame 22 comprises a base plate 40 having openings which receive fasteners 44 for securing the base plate to the underside of the upper door frame. The base plate 40 also includes an opening 46 for the electrical cable 16 which leads from the security system to the external power source 13 and various associated remote components. A pair of substantially identical, trapezoidal end plates 50 extend at opposing ends of the base plate and receive screws 51 for mounting bottom panel 52. The bottom panel 52 extends in general parallel relationship to the base plate but has a transverse width which is less than the corresponding width of the base plate.

Figure 6:
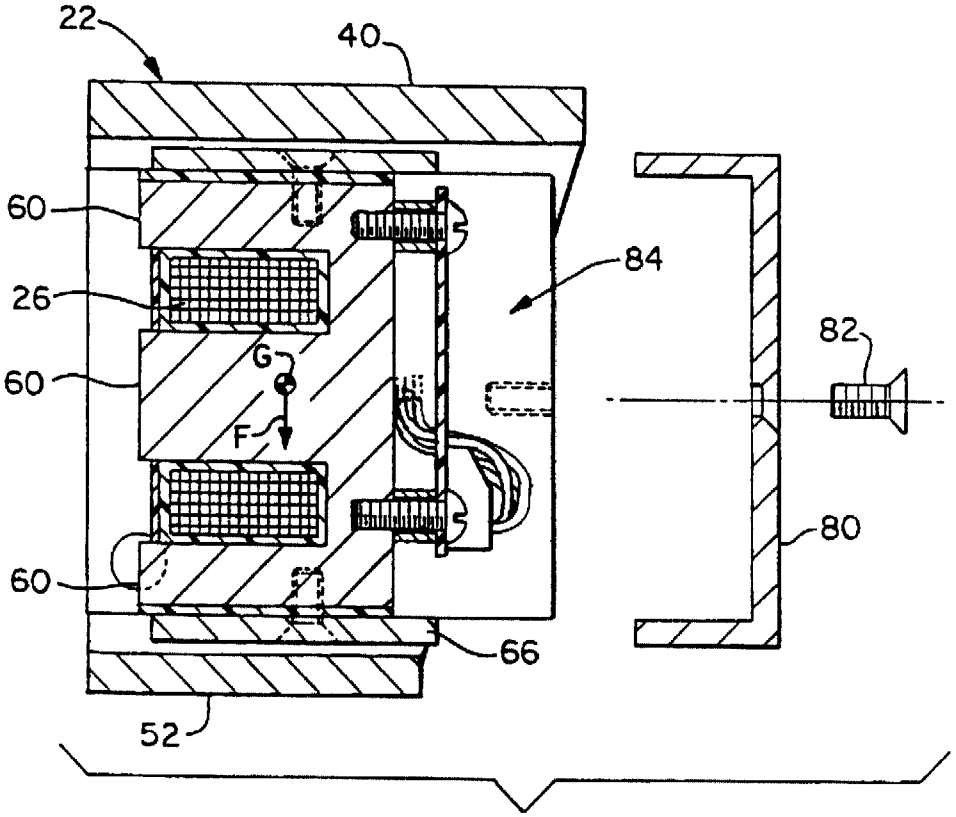
FIG. 6 is a side exploded view, partly broken away and partly in section, of the electromagnetic assembly of FIG. 4.
Figure 5:
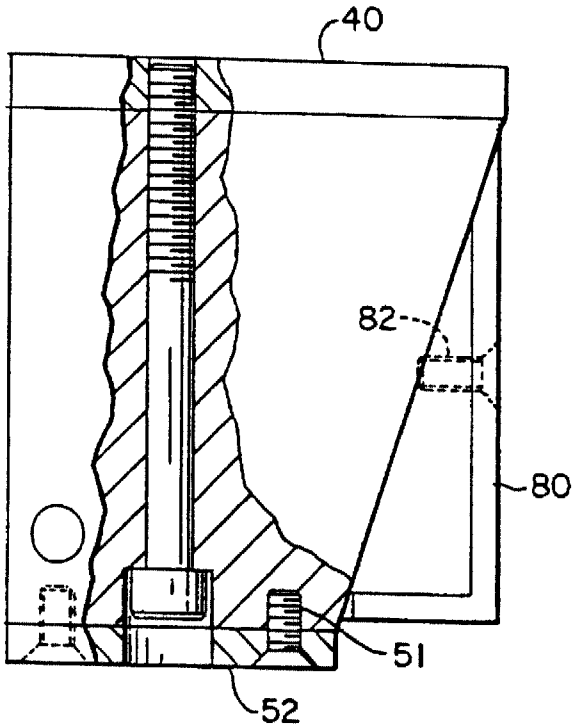
FIG. 5 is a side view of the electromagnetic assembly of FIG. 4. partly broken away and partly in section.
Figure 7:
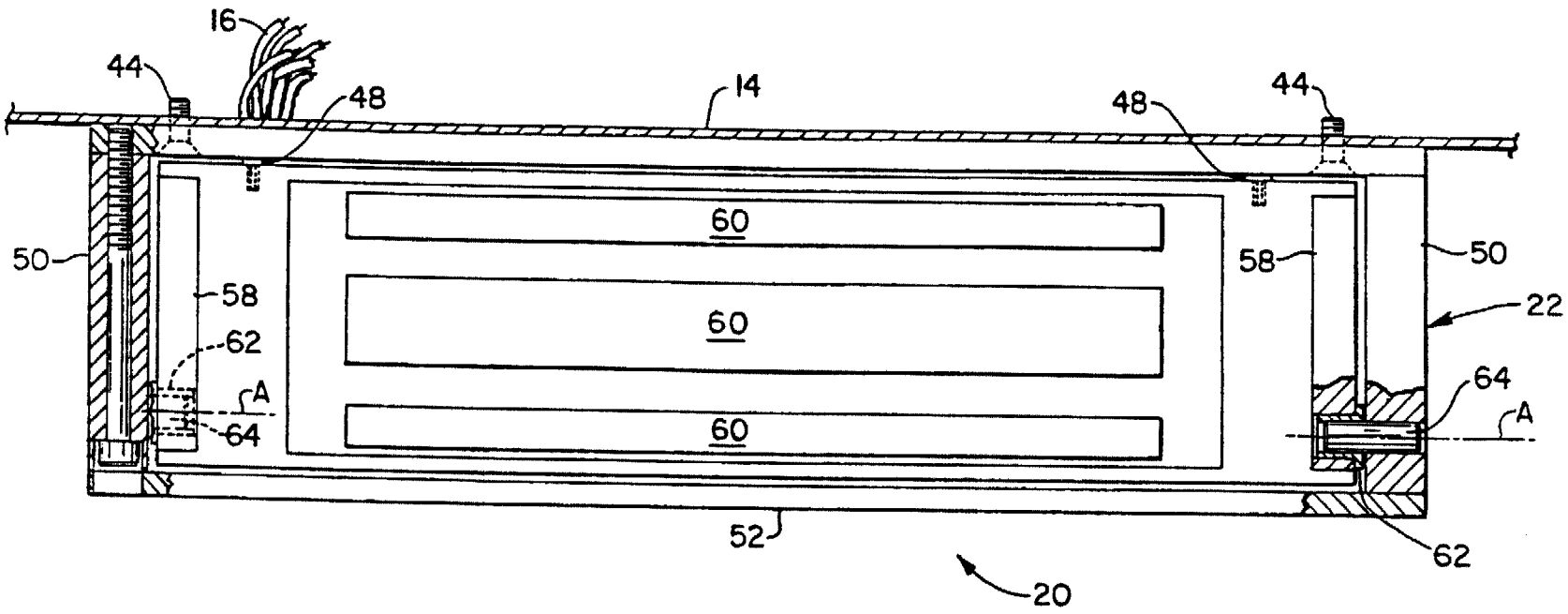
FIG. 7 is a front elevational view, partly broken away and partly in section, of the electromagnetic assembly of FIG. 4.

The housing 24 has a substantially rectangular configuration which is dimensioned for limited pivotal movement within the bracket frame 22. The housing 24 mounts the generally E-shaped electromagnet 26. The electromagnet defines a generally frontally disposed planar attracting surface 60, as best illustrated in FIG. 7. The housing has a pair of laterally spaced end panels 58 having aligned bores which receive bushings 62. The end panels are adjacent the end plates 50 of the bracket frame. A pair of coaxial pivot pins 64 extend from the end plates and are received in the bushings so as to pivotally mount the housing to the bracket frame assembly. The coaxial pivot pins are disposed so that the pivot axis A of the pivot pins 64 is co-planar with the attracting surface 60 and is located below the center of gravity G, as illustrated in FIGS. 6 and 7.

Figure 2:
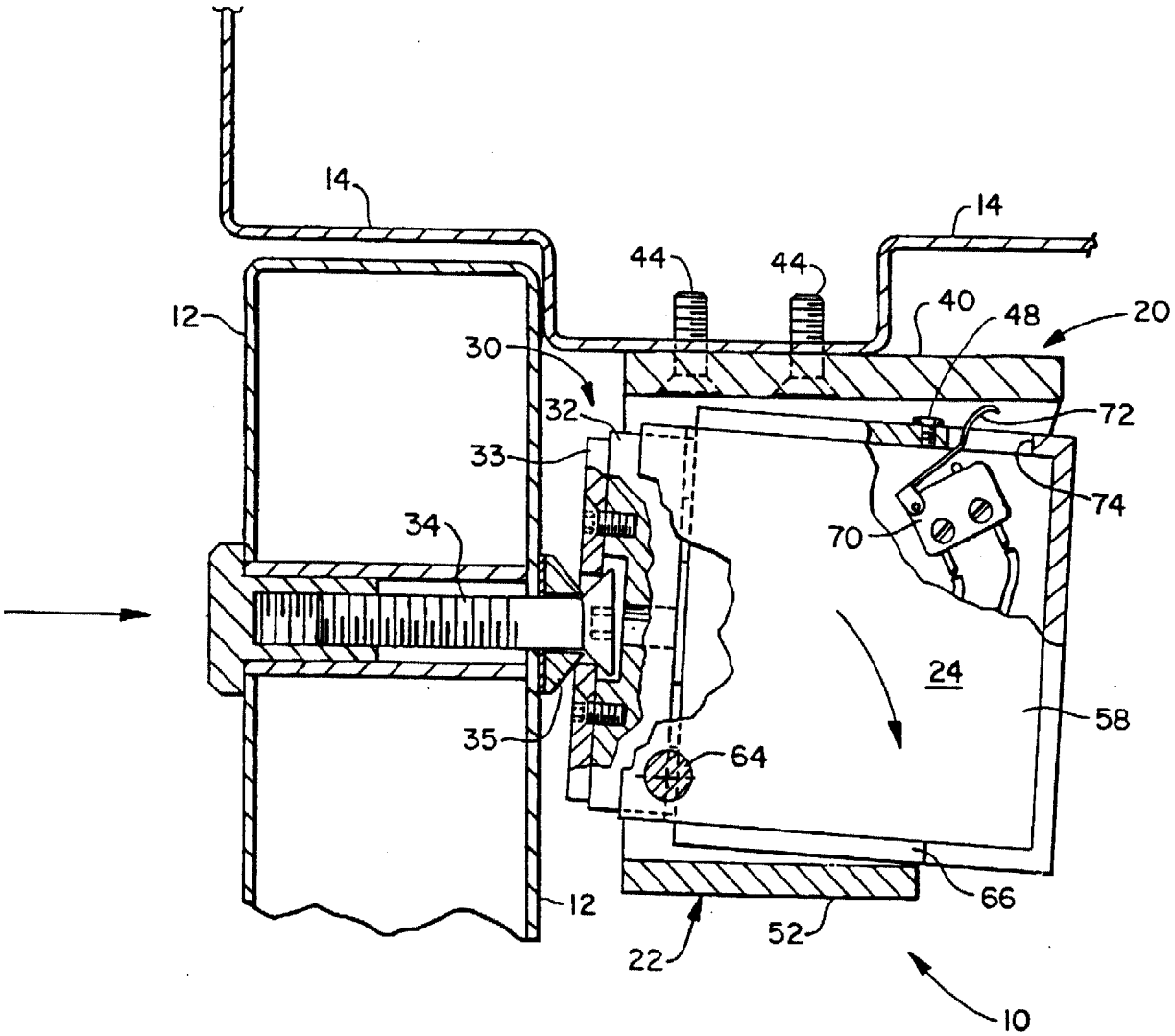
FIG. 2 is a side sectional view of the door security system of FIG. 1, partly broken away, illustrated in conjunction with a door frame and an exit door for the normal locked state.
Figure 3:
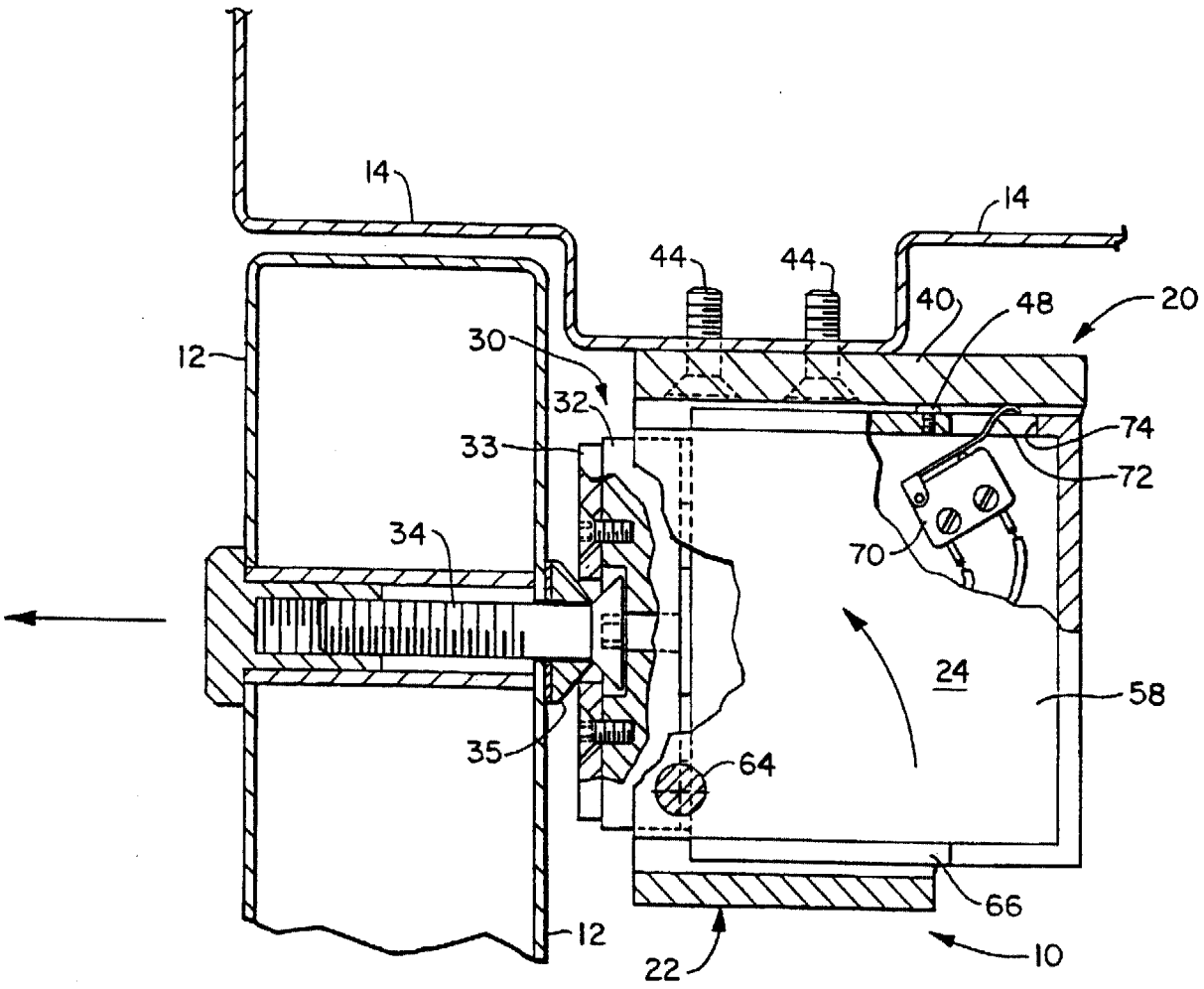
FIG. 3 is a side sectional view of the door security system of FIG. 1, partly broken away, illustrated in conjunction with a door frame and an exit door for a position wherein an attempt is made to exit the exit door.

The housing 24 is dimensioned and oriented with respect to the bracket frame 22 to permit limited pivotal or rocking displacement of the housing from the downward position illustrated in FIG. 2 to the upward position illustrated in FIG. 3. The downward position is defined by the interference of the bottom panel 66 of the housing with the bottom panel 52 of the bracket frame. A pair of laterally spaced stop pins 48 in the form of headed screws are threaded into the top of the housing and extend upwardly so as to project a small distance above the housing. The distance of projection above the housing top is adjustable. The upper pivotal position of the housing is defined by engagement of the stop pins 48 against the base plate 40.

A switch 70, such as a Burgess F4T7YC switch is mounted in the housing. The switch 70 includes an actuating arm 72 which projects through an opening 74 formed in the top panel of the housing. The actuating arm 72 and the switch 70 are configured and positioned so that in the downward pivotal position of FIG. 2, the arm does not contact the base plate 40 or only lightly contacts the base plate, and in the upper pivotal position of FIG. 3, the arm 72 sufficiently engages the base plate to actuate the switch 70.

The armature assembly 30, which may be similar to the armature assembly disclosed in U.S. Pat. No. 4,957,316, comprises an armature plate 32 and a back plate 33. A fastener 34 has a head received in a recess of the plate 32 and an aperture of plate 33. The shank of the fastener is anchored by a nut which is received in a sleeve of the door. A spacer collar 35 is interposed between the door and the head of the fastener. The fastener 34 is configured so that it cannot be overtightened and provides for limited pivotal movement of the armature plate 32 about the fastener, as best illustrated in FIGS. 2 and 3.

Figure 4:
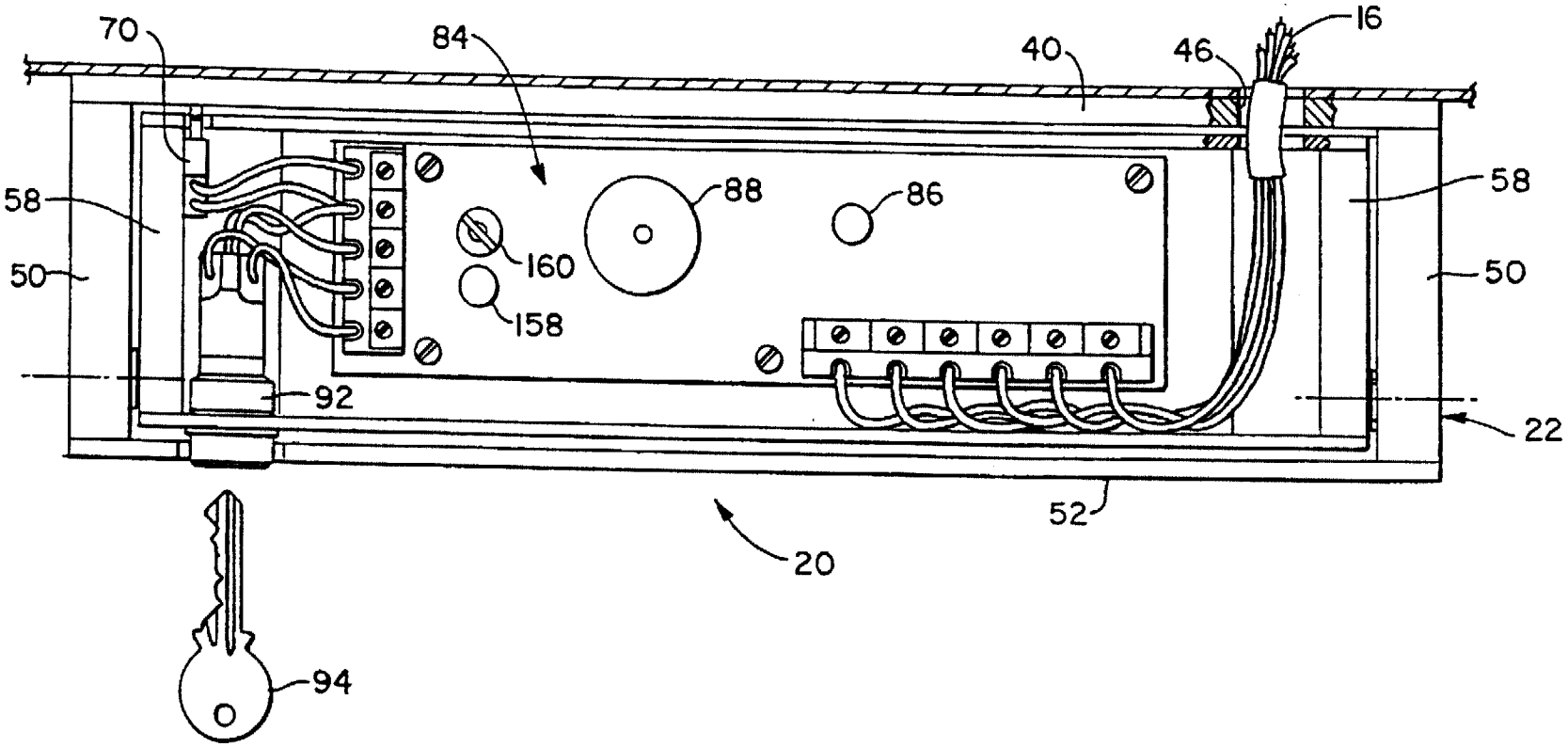
FIG. 4 is a rear view of the electromagnetic assembly of the security system of FIG. 1, partly in schematic, with the back panel portion being removed.

A rear cover 80 is secured to the housing body by two screws 82. The cover 80 may be easily removed to provide access to a control module 84 which is disposed rearwardly of the electromagnet 26. The control module includes circuitry which connects with the switch 70 and includes an exteriorly visible indicator light 86 and a horn, siren or audio speaker 88. In one embodiment, a time delay circuit is also incorporated into the control module. The light 86 is a bi-color LED. When the LED is green, the electromagnet 26 is de-energized and the door is unlocked. The LED 86 pulses red flashes upon sending a delay request and continues pulsing throughout the delay time interval. A switch 92 which may be actuated by a key 94 inserted through the bottom panel of the frame and housing also is electrically connected with the control module 84. A yellow LED 158, which is visible only when the cover 80 is removed, is energized when the power is on and switch 70 is in an actuated state. The positions of the switch 70, key switch 92 and other components illustrated in FIG. 4 may be reversed in relation to the ends of the housing.

The door is latched to the door frame by latch 19 which is responsive to the panic bar 18. A mortise lock (not illustrated) or any other device which employs a mechanical latch may also be employed with the security system 10. For some applications, the security system may be employed in conjunction with a door having no latch. Power from the power source energizes the electromagnet 26 to magnetically bond with the armature to maintain the door in a locked state. In case of smoke, fire or other emergency, an alarm 98 overrides all other inputs and interrupts power to the electromagnet to release the electromagnetic bonding and to thereby instantaneously unlock the door. Egress (right to left in FIGS. 2, 3 and 10) through the door is permitted by releasing the latch 19 in a conventional fashion.

Under normal operating conditions wherein the door is locked and no exit is attempted, the pivotal orientation and locked state of the system is illustrated in FIG. 2. The armature is magnetically bonded t the electromagnet to lock the door. The door is latched by the mechanical latch 19 and cannot be opened without unlatching. The housing 24 is pivoted downward under the force of gravity due to the eccentric relationship between the center of gravity of the housing and the pivot axis A until the bottom of the housing engages the bottom plate 52 of the bracket frame. The floatable armature plate 32 follows the electromagnet and maintains the engaged bonding relationship with the attracting surface due to the limited pivotal mount of the armature to the door. In the FIG. 2 locked position, the actuating arm 72 is free, i.e., does not engage the base plate 40, and the switch 70 is not actuated.

With reference to FIG. 3, when an attempt is made to exit through the door, the push bar 18 is actuated to release the latch 19 and push open the door. The force applied to the door is transferred through the armature to the electromagnet. The resultant rotating moment around the pivot axis A tilts the housing in an upward pivotal position until the stop pins 48 at the upper rear edge of the housing engage the base plate 40. At this position, further pivotal movement of the housing relative to the frame assembly terminates, and the door for a time remains locked due to the magnetic force between the electromagnet 26 and the armature plate 32. The limiting position defined by the stop pins 48 may be adjustable.

In the upward pivotal position, the actuating arm 72 of the switch is now engaged against the base plate to thereby actuate the switch 70. A time delay in the control module circuitry is commenced by actuation of the switch 70. The audio alarm 88 is simultaneously actuated. After a pre-established time interval, which is typically 15 or 30 seconds, power to the electromagnet 26 will be interrupted to thereby unlock the door. The audio alarm will continue until it is manually reset by the key switch 92. Regardless of the implementation of the delay interval, in the event of an emergency condition, such as smoke, fire or other emergencies which may be detected at a remote station, power to the electromagnet is interrupted thereby providing a delay-free egress through the door. The security system may also allow for instant delay-free egress in some embodiments.

The pivoting or rocking electromagnetic housing which results in actuation of switch 70 generates a signal which is responsive to only a one-way-door movement to an open position (in the direction of the FIG. 3 arrow). Door movement in the counter or closing direction or the absence of door movement in the normal latched state will automatically result in the switch assuming the unactuated state. The unactuated state results from the downward pivotal position of the housing under the force of gravity.

Figure 8A:
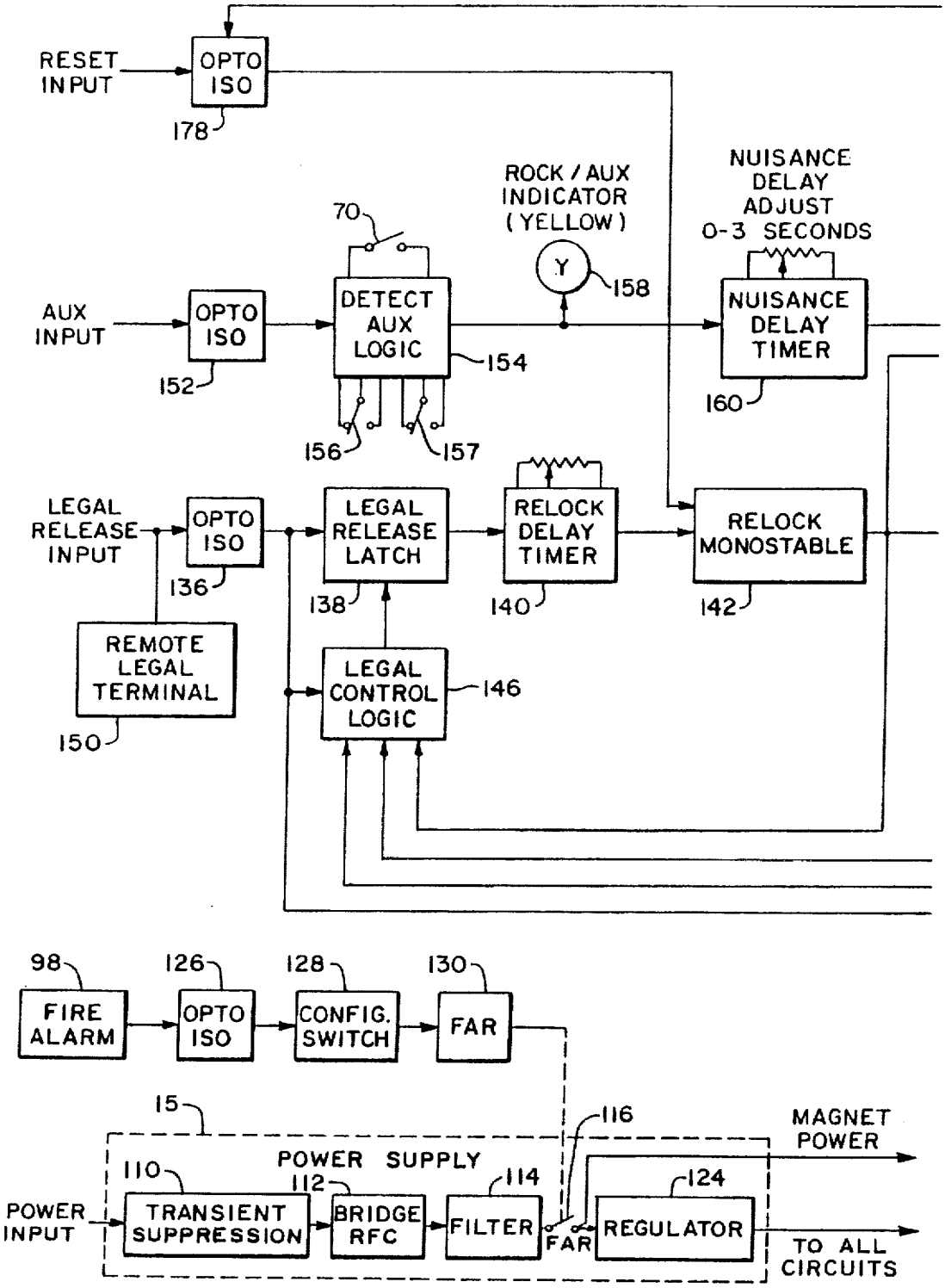
FIGS. 8A and 8B are a simplified schematic block diagram of the door security system of FIG. 1.
Figure 8B:
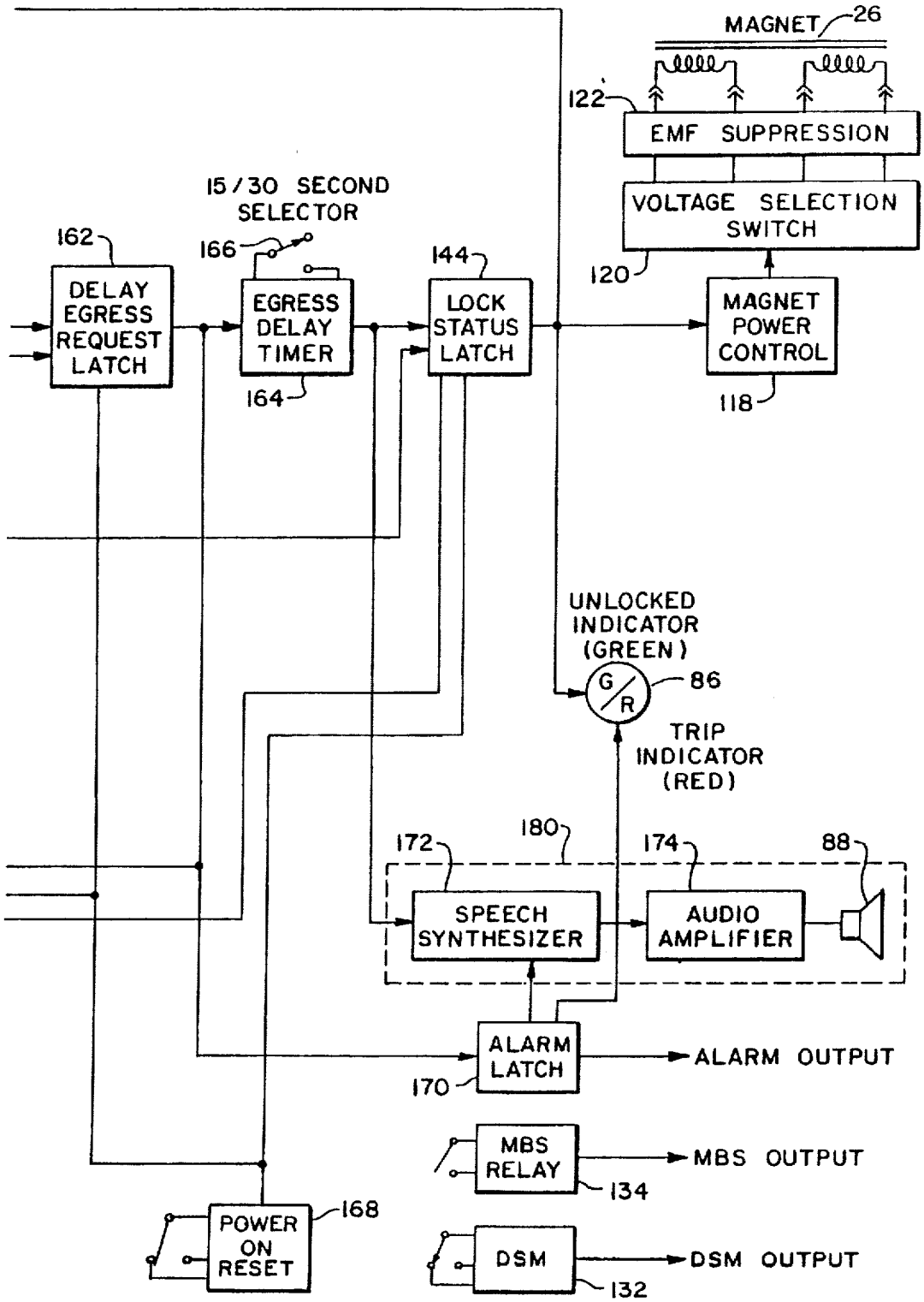

The exit door security system 10 preferably includes a multi-function and multi-option capability as illustrated by the schematic block diagram in FIGS. 8A and 8B. The power supply 15 which may have a plug-in or box mounted configuration, includes a transient suppression circuit 110, a bridge rectifier 112 and a filler 114. The filtered power is passed across fire alarm relay switch 116 to the magnetic power control circuit 118. The power output from control circuit 118 is applied to the electromagnet 26 via a voltage selection switch 120 and a voltage suppression circuit 122. The voltage selection switch 120 is set at the installation site to select the input power voltage, for example, 12 or 24 volts. The filtered input voltage is also passed through a voltage regulator 124 and the regulated voltage is applied to all of the circuits of the security system.

The fire alarm 98 communicates via an optical isolator 126 and a configuration switch 128 with a fire alarm relay 130 which governs the position of the fire alarm switch 116. The switch, 128 is manually set in accordance with whether the associated fire alarm is configured to have normally open or normally closed contacts. An Aromat PQ2E9V relay is suitable for fire alarm relay 130. Upon activation of the fire alarm 98, power is essentially removed at the switch 116 to terminate the power to the magnet 26 and thereby unlock the exit door.

A door status switch 132 of conventional form may be employed to generate a signal for remote monitoring which indicates whether the door is opened or closed. The switch may assume the form of a small magnet which is concealed in an aluminum member attached to the end of the armature plate 32. The sealed magnet actuates a magnetic reed switch mounted on the inside of the housing 24.

A magnetic bond sensor 134 which senses whether there is sufficient magnetic holding force to ensure adequate locking of the exit door may also be employed. The magnetic bond sensor 134 is responsive to low line voltage, and/or foreign material in the magnetic gap between the electromagnet and the armature, and/or dirty or damaged surfaces of the electromagnet and/or the armature. The magnetic bond sensor signal is also generated to provide for remote monitoring.

A legal release input signal, which may be implemented by a selected position of key switch 92, allows for a door to be unlocked without delay. The legal release input immediately interrupts power to the electromagnet which remains unenergized as the contacts are closed and the legal release input signals are present. No alarm or audio signal is generated while the legal release input is present. The signal is applied via an optical isolator 136 to a lock status latch 144. Latch 144 generates an input to the magnet power control circuit 118 to instantly terminate power to the magnet 26. The legal release signal is also applied to a legal release latch 138 which generates an output to the relock delay timer 140 for initiating a relock sequence. The relock timer 140 is adjustable over a period of 0 to 30 seconds for delaying the energization of the electromagnet. When the legal release input signal terminates, the electromagnet is re-energized upon expiration of the delay period imposed by relock timer 140. The signal from the delay timer 140 is applied to a relock monostable circuit 142 which communicates with the lock status latch 144. The output from latch 144 is applied to the power control circuit 118 to maintain either an energized locked status for the electromagnet or an unenergized released status. In addition, the output signal from the monostable circuit 142 is applied to the legal control logic circuit 146, which functions to control legal egress through the exit door by controlling the relocking sequence. The legal release may be generated from local devices such as a local key switch 92 or a remote terminal 150 such as a remote push button, a key pad, a card reader or an access control terminal at the entrance side of the exit door.

An auxiliary input signal indicative of an unauthorized exit request is applied via an optical isolator 152 to a detect/auxiliary logic circuit 154. The other input to logic circuit 154 are signals from the sensor switch 70 and signals from auxiliary configuration switches 156 and 157. Switch 70 essentially provides an unauthorized exit detection signal. The auxiliary input may originate from various sources such as from a switch in the panic bar or another motion or presence actuated switch and may be employed as a redundant sensor signal in conjunction with switch 70. Bi-stable switches 156 and 157 are mounted on the circuit board and are each settable by removing cover 80 and setting each switch to one of two states A and B. Logic circuit 154 employs the input from the auxiliary input and the switches 156, 157 and 70 to perform the logic set forth in Table I below:

TABLE I

| Switch 156 | Switch 157 | Auxiliary Function |
|---|---|---|
| A | B | Internal Only |
| B | A | External Only |
| A | A | External Parallel |
| B | A | External Series |

In the internal only logic mode, only the switch 70 is used as the sensory input to indicate a request to exit. In the external only mode, the switch 70 is ignored as a sensory input, and the auxiliary input initiates the delay egress request as will be further described below. In the external parallel mode, either the sensory input from the switch 70 or the auxiliary input will trigger a delay exit request and therefore a redundant sensory input is provided. In the external series logic mode, both the internal switch 70 and an external contact closure generating the auxiliary input signal are required in order to initiate the exit delay implementation for the system. The external series logic mode has.application in connection with a passive infrared sensor to distinguish between an opening force applied to the exit door from the inside as opposed to the outside of the exit door. A yellow indicator LED 158 may be employed to indicate the lock status dictated by the logic circuit 154.

The output from the logic circuit 154 is applied to a nuisance delay timer 160. Timer 160 includes an adjustment for selecting a nuisance time interval, e.g., 0 to 3 seconds, so that a false, inadvertent or accidental sensed egress request such as, for example, door movement due to stack pressure, does not initiate the delay egress sequence. The nuisance adjustment may be implemented by a small screwdriver. The output signal from the nuisance delay timer 160 is applied to the delay egress request latch 162 which starts the delay egress timer 164. The delay egress timer 164 is adjustable by 15 or 30 second selector switch 166 which implements either a 15 or 30 second time delay (after expiration of the nuisance timer 160 delay, if any) for release of the electromagnet. At the end of the delay interval, an output signal from timer 164 is applied to the lock status latch 144 to release the electromagnet.

The output signal from the delay egress request latch 162 is also applied to an alarm latch 170. The alarm latch 170 generates an alarm signal which is transmitted to a remote location, such as a central console or security station within the building. The output from the delay timer 164 and the output from alarm latch 170 is applied to a speech synthesizer 172. The speech synthesizer 172 generates an output which is passed through an audio amplifier 174 to speaker 88. The audio transmission speaker 88 may transmit a recorded message such as "AFTER A 30 SECOND DELAY, THE EXIT DOOR WILL UNLOCK" or other appropriate message. In addition, the output from the alarm latch is applied to the indicator light 86. In a preferred form, the indicator changes from a red light to a green light upon release of the electromagnetic lock.

Figure 9:
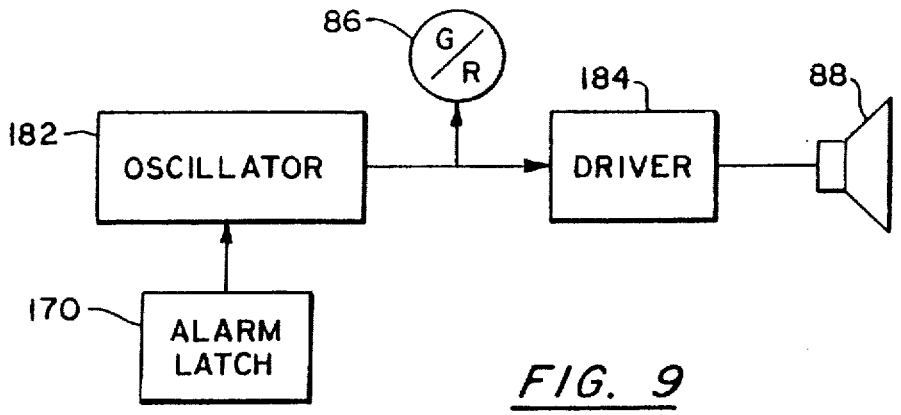
FIG. 9 is a simplified schematic block diagram of an alternate portion of the diagram of FIG. 8B.

An alternative configuration for an alarm system which may replace sub-circuit 180 is illustrated in FIG. 9. The signal from the egress delay timer 164 is applied to an oscillator 182. The oscillatory signal from the oscillator is then applied to a driver circuit 184 for transmission to the horn 88 to generate an oscillatory audio alarm. The output from the oscillator 182 is then applied to the LED 86 to drive the LED at measured intervals, such as ½ to 1 second intervals. The individual requesting egress may essentially mentally count along with the generated LED pulses to thus provide assurance that the lock release cycle is in the process of implementation. The LED 86 and the alarm at horn 88 are transformed to steady states upon expiration of the egress delay interval.

A reset input signal is applied via an optical isolator 178 to the relock monostable 142. The reset input signal functions to reset the system, e.g., to re-energize the electromagnet 26 and terminate the alarm. Although a remote reset is technically feasible, due to safety regulations it is desirable for most applications that the reset be implemented by the key switch 92. Alternatively, a separate local key switch (not illustrated) may be employed as a reset switch if the key switch 92 is located at a height beyond normal reach or a mortise-type lock is desired.

In preferred form, key switch 92 is a three position key switch which selects normal operation, reset and legal egress modes. At the center key switch position, a normal operation is maintained. At a clockwise reset key switch position, which is momentarily held against spring bias which returns the key switch to the center position upon release, the reset input initiates locking of the door after a power up or following an egress. The reset position will function only when the door is unlocked and will not terminate the egress delay unless the door is initially unlocked. The clockwise reset position terminates the audio alarm and prepares the security lock system for the next delay request. A counter-clockwise legal key switch position, which is a stable position, allows for instantaneous legal egress wherein the door is immediately unlocked. No alarm is generated and the green LED is energized in the legal egress mode. When the key is returned to the center normal position, the delay relock sequence begins or the key can be turned to the releasable reset position to immediately lock the door.

A power on reset switch 168 is employed for selectively implementing a lock status mode where either the electromagnet 26 is normally on, i.e., energized or is normally off. As will be described below, a number of applications for the security system require that the lock status be normally off.

Figure 10:
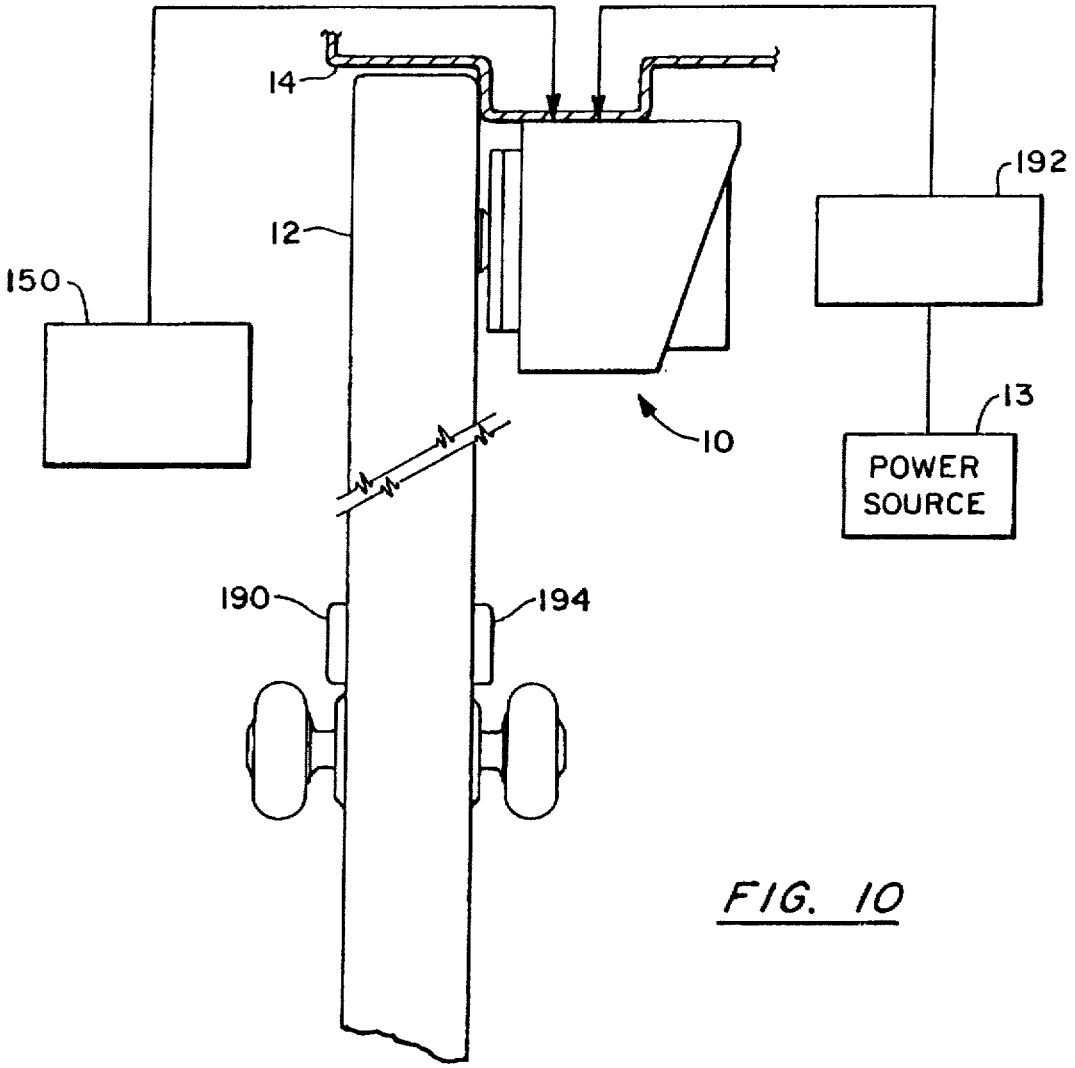
FIG. 10 is a simplified schematic block diagram illustrative of numerous other applications of the door security system of FIG. 1.

With reference to FIG. 10, the security system 10 provided by the described electromagnetic lock circuitry is adaptable for implementation in connection with a wide variety of exit door configurations which accommodate selected safety, legal egress and security features. The described switches and logic circuits provide multi-option capability which is integrated with the conventional mechanical and latching hardware. A single master unit of the security system is readily suitably adjusted for the requirements of a given application. For example, the door may have an exterior key lock which provides for legal or authorized access through the exit door. A key pad, card reader or other electronic entry device 150 may be positioned at the exterior of the exit door to provide legal or authorized access to the enclosure. In addition, a sensor 192 which may take the form of a passive infrared presence device, a device which senses the presence of a magnetic material, a device which senses the presence of an electromagnetic material or field, a device which is responsive to a selected radio frequency, or other sensory device may be mounted at the interior of the enclosure in the vicinity of the electromagnet assembly 20. The key pad 150, key lock 190 and sensor 192 are naturally optional features which if employed can provide a wide variety of security arrangements. In addition, it should be noted that the power on reset switch 168 may be set to either a normally on or normally off power mode for the electromagnet when power is initially applied to the lock. In addition to the foregoing, the door itself may include locking/latching hardware 194 which allows for the door to be selectively locked or unlocked with respect to permitting access through the door from the exterior.

The sensor 192 may take the form of a passive infrared sensor which senses the presence of an individual at the door. The PIR sensor provides either a redundant switch for actuating the time delay for the electromagnetic lock or a means for discriminating between a door movement (actuating switch 70) which is produced from inside of the enclosure as opposed to the outside. Alternatively, the sensor 192 may take the form of a switch which is activated by the presence of a magnetic or electromagnetic object in the vicinity of the switch, such as, for example, may be present in conventional shoplifting type security installations. The sensor 192 may also be responsive to a selected radio frequency, such as, for example, may be generated by a bracelet or other device which is worn by patients at a convalescent home or other facility where it is desired to control egress through the exit door for a selected subset of the population. The sensor 192 normally interrupts power to the lock until the sensor senses an individual at the door or other activating event in which case the door is locked.

In the latter application, the power on reset switch 168 may be set to a normally off position so that free access is normally provided through the exit door. However, when the sensor activates by sensing a selected object (individual) in the vicinity of the exit door, the electromagnetic lock system is transformed to a normally locked state. Any subsequent attempt to open the exit door and thereby trigger movement of the door will initiate the implementation of the time delay period until the door is unlocked to provide a delayed egress through the exit door. It should be noted that instant legal egress may be provided by the key switch 92 or other suitable input in addition to the normal implementation of the time delay interval. In addition, a safety override to immediately release the electromagnetic lock may be provided for all of the various alternative configurations by means of the signal from the fire alarm 98 as previously described.

Even when one gains legal access such as by terminal 150 or lock 190, a time delay may be implemented via switch 70 to delay unlocking of the door. Likewise, the mechanical door latch 194 may be set to prevent or allow access through the exit door from the exterior.

A summary of various security system configurations which may be provided in accordance with the invention is summarized in Table II. It should be noted that all of the configurations of Table II may also include a safety or fire alarm input override to provide instant safety egress through the exit door.

TABLE II

| AUXILIARY OUTSIDE MODULE PAD 150/ LOCK 190 | TABLE I AUXILIARY SWITCH CONFIGURATION | AUXILIARY INSIDE MODULE SENSOR 192 | DOOR LATCH STATUS LATCH 194 | NORMAL EM OPERATION SWITCH 168 | EXIT DOOR EGRESS | EXIT DOOR ACCESS |
|---|---|---|---|---|---|---|
| — | Internal | — | Unlatched | OFF | Delay<br>Instant Legal | NO |
| — | Internal | — | Latched | OFF | Delay<br>Instant Legal | Delay |
| Key Lock | Internal | — | Latched | OFF | Delay<br>Instant Legal | Legal Delay |
| Key Pad | Internal | — | Latched | OFF | Delay<br>Instant Legal | Instant Legal<br>Delay |
| Key Pad<br>Key Lock | Internal | — | Latched | OFF | Delay<br>Instant Legal | Instant Legal |
| — | Series | IR | Latched | OFF | Delay<br>Instant Legal | NO |

TABLE II-continued

| AUXILIARY OUTSIDE MODULE PAD 150/ LOCK 190 | TABLE I AUXILIARY SWITCH CONFIGURATION | AUXILIARY INSIDE MODULE SENSOR 192 | DOOR LATCH STATUS LATCH 194 | NORMAL EM OPERATION SWITCH 168 | EXIT DOOR EGRESS | EXIT DOOR ACCESS |
|---|---|---|---|---|---|---|
| Key Pad | Series | IR | Latched | OFF | Delay<br>Instant Legal | Instant Legal |
| — | Internal | — | Unlatched | OFF | Delay<br>Instant Legal | Delay |
| Key Pad | Internal | — | Unlatched | OFF | Delay<br>Instant Legal | Instant Legal<br>Delay |
| — | Series | IR | Unlatched | OFF | Delay<br>Instant Legal | NO |
| Key Pad | Series | IR | Unlatched | OFF | Delay<br>Instant Legal | Instant Legal |
| — | Internal | Sensor | Latched | ON | Free-if EM not activated<br>Delay-otherwise | NO |
| — | Internal | Sensor | Unlatched | ON | Free-if EM not activated<br>Delay-otherwise | Free |
| Key Lock | Internal | Sensor | Latched | ON | Free-if EM not activated<br>Delay-otherwise | Legal |
| — | Internal | Sensor | Unlatched | ON | Free-if EM not activated<br>Delay-otherwise | Free |
| — | Internal | Sensor | Latched | ON | Free-if EM not activated<br>Delay-egress<br>Instant Legal | Delay |
| Key Lock | Internal | Sensor | Latched | ON | Free-if sensor activated<br>Delay-otherwise<br>Instant Legal | Legal Delay |
| Key Pad | Internal | Sensor | Latched | ON | Free-if sensor activated<br>Delay-otherwise<br>Instant Legal | Instant Legal<br>Delay |
| Key Lock<br>Key Pad | Internal | Sensor | Latched | ON | Free-if sensor activated<br>Delay-otherwise<br>Instant Legal | Instant Legal |
| — | Internal | Sensor | Unlatched | ON | Free-if sensor activated<br>Delay-otherwise<br>Instant Legal | Delay |
| Key Pad | Internal | Sensor | Unlatched | ON | Free-if sensor activated<br>Delay-otherwise<br>Instant Legal | Instant Legal<br>Delay |

It will be appreciated that the foregoing door security system 10 provides a sophisticated electromagnetic lock for locking an exit door while also providing a very efficient and reliable means for releasing the lock either instantly or after a pre-established time delay and for sounding an alarm to ensure control over egress from the enclosure. Actuation of switch 70 is produced by door movement in the opening direction only. The security system also provides for immediate legal or authorized egress and implements a safety override for immediate egress in the event of an emergency. The signal from switch 70 in some applications is not employed to release the lock (either instant or delay) but may be employed for other functions relating to controlling egress and/or access through the door. For example, the signal from switch 70 may be employed as a signal indicative of an attempt to tamper with a secured door.

While a preferred embodiment of the foregoing invention has been set forth for purposes of illustration, the foregoing description should be not be deemed a limitation of the invention herein. Accordingly, various modifications, adaptations and alternatives may occur to one skilled in the art without departing from the spirit and the scope of the present invention.

What is claimed is:

1. A security system for a door comprising:

frame means adapted for mounting to a door frame;

housing means mounting an electromagnet defining an attraction surface at one side of said housing means;

pivot mounting means for pivotally mounting said housing means to said frame means;

armature means adapted for mounting to a door and attractable by said electromagnet for magnetic bonding therewith; and switch means mounted at said housing means and actuatable in response to pivotal displacement of said housing means relative to said frame means for generating a first signal.

2. The security system of claim 1 wherein said pivot mounting means comprise a pair of co-axial pivot pins defining a pivot axis substantially co-planar with the attraction surface of said electromagnet.

3. The security system of claim 2 wherein said pivot axis is spaced from the center of gravity of said housing means.

4. The security system of claim 2 wherein when said frame means is mounted to said door frame and said pivot axis is substantially horizontal, said housing means is pivotal about said pivot axis in a generally upward and downward direction.

5. The security system of claim 4 further comprising first restriction means for restricting downward pivotal movement of said housing means relative to said frame means.

6. The security system of claim 5 wherein said frame means comprises a bottom plate and said first restriction means comprises said bottom plate.

7. The security system of claim 4 further comprising second restriction means for restricting upward pivotal movement of said housing means relative to said frame means.

8. The security system of claim 7 wherein said frame means comprises a base plate and said second restriction means comprises adjustable stop pins mounted to said housing means and engageable against said base plate.

9. The security system of claim 1 further comprising delay circuitry means mounted in said housing means, said delay circuitry means being responsive to said first signal for deactivating said electromagnet after a pre-established time interval.

10. The security system of claim 1 further comprising alarm means responsive to said first signal for activating a sensory perceivable alarm.

11. The security system of claim 10 wherein said alarm means comprises a horn mounted at said housing means.

12. The security system of claim 10 further comprising a keyway disposed in said housing means and a key receivable in said keyway and rotatable to a first position for terminating activation of said alarm.

13. The security system of claim 12 wherein said key is rotatable to a second position for deactivating said electromagnet.

14. The security system of claim 1 further comprising power supply means for selectively supplying electrical power to said electromagnet and safety means for automatically terminating power to said electromagnet in the event of an emergency.

15. The security system of claim 1 further comprising release circuitry means mounted in said housing means and responsive to said first signal for deactivating said electromagnet.

16. The security system of claim 15 wherein said switch means comprises an actuating arm and said housing means is pivotal between first and second pivotal positions, said actuating arm being unactuated in the first pivotal position and actuated in the second pivotal position.

17. A security system for a door comprising:

frame means comprising mounting means and laterally spaced end support means;

housing means mounting an electromagnet defining an attraction surface at one side of said housing means;

pivot mounting means pivotally mounting said housing means to said end support means, said housing means being received in an enclosure defined by said frame means and pivotal between first and second pivotal positions;

armature means attractable by said electromagnet for magnetic bonding therewith; and switch means having an unactuated state at said first position and an actuated state at said second position for generating a first signal.

18. The security system of claim 17 wherein said frame means comprises a base plate and said switch means is mounted at said housing means and comprises an actuating arm engageable with said base plate at the second position.

19. The security system of claim 17 wherein said electromagnet and armature means are magnetically bondable at both the first and second positions.

20. An exit door security system comprising:

housing means mounting electromagnet means for generating a magnetic field;

armature means adapted for mounting to a door and attractable by said electromagnet means for magnetic bonding therewith;

switch means mounted at said housing means and actuatable in response to reactive movement of said housing means resulting from movement of said door for generating an egress request signal;

discriminator means for discriminating between door movement resulting from an internal force applied on one side of said door and an external force applied on the other side of said door and generating a discriminator signal indicative thereof; and circuit means responsive to said egress request signal and said discriminator signal for selectively deactivating said electromagnet means.

21. The security system of claim 20 wherein said discriminator means further comprises a passive infrared sensor.

22. The security system of claim 20 wherein said discriminator means further comprises an auxiliary switch means actuatable in response to an attempt to open the door for generating an auxiliary signal, said request signal and said auxiliary signal being processed in series.

23. The security system of claim 20 further comprising legal entry means selectively activatable to substantially simultaneously deactivate said electromagnet means.

24. The security system of claim 23 wherein said legal entry means comprises a key switch mounted to said housing means and a corresponding key, said legal entry means being activatable in response to rotation of said key in said key switch.

25. The security system of claim 23 wherein said legal entry means further comprises a key pad.

26. The security system of claim 23 wherein said legal entry means further comprises a card reader.

27. An exit door security system comprising:

housing means mounting electromagnetic means activatable for generating a magnetic field;

armature means adapted for mounting to a door and attractable by said electromagnetic means for magnetic bonding therewith;

switch means mounted at said housing means and actuatable in response to reactive movement of said housing means resulting from movement of said door in an opening direction for generating a first signal;

mode means for selectively implementing either a normal activated magnetic bonding mode of said electromagnet means or a normal unactivated bonding mode of said electromagnet means; and delay circuit means responsive to said mode means and said first signal for deactivating said electromagnet means after a pre-established delay interval.

28. The security system of claim 27 further comprising sensor means for detecting the presence of a magnetic element and transforming said mode means to an activated bonding mode.

29. The security system of claim 27 further comprising RF sensor means for detecting a selected radio frequency generated in the vicinity of said housing means and transforming said mode means to an activated bonding mode.

30. The security system of claim 27 further comprising sensor means for detecting the presence of an electromagnetic element and transforming said mode means to an activated bonding mode.

31. The security system of claim 27 further comprising legal egress means selectively actuatable for immediately deactivating said electromagnet means.

32. The security system of claim 27 further comprising safety means automatically actuatable in response to an emergency for immediately deactivating said electromagnet means.

33. A door security system comprising:

housing means mounting electromagnet means activatable for generating a magnetic field;

armature means adapted for mounting to a door and attractable by said electromagnet means for magnetic bonding therewith;

switch means mounted at said housing means and actuatable in responsive to reactive movement of said housing means in response to movement of said door in an opening direction for generating a first signal;

light emitting means mounted at said housing means for emitting a visible light; and circuit means responsive to said first signal for deactivating said electromagnetic means after a pre-established delay interval, said circuit means comprising oscillation means for pulsing said light emitting means during said delay interval.

34. The security system of claim 33 further comprising latch means for transforming said light emitting means to a state of generally steady radiation after the time delay interval terminates.

35. The security system of claim 33 further comprising electronic message means for generating a voice message for transmittal from said housing means, said electronic message means being responsive to said switch means.

36. The security system of claim 33 wherein said circuit means further comprises nuisance delay means for preventing deactivation of said electromagnetic means in the event said switch means is not actuated for a time which exceeds a pre-established nuisance delay period.

37. The security system of claim 33 further comprising alarm means responsible to said first signal for generating an audible alarm at said housing means.

38. The security system of claim 37 wherein said oscillation means further pulses said alarm means to produce an oscillatory audible alarm during the time delay interval and said audible alarm transforms to a steady state after termination of the delay interval.

*39. A door security system comprising:*

*housing means mounting electromagnet means activatable for generating a magnetic field;*

*armature means adapted for mounting to a door and attractable by said electromagnet means for magnetic bonding therewith;*

*sensor means for generating a signal;*

*electronic message means for generating a voice message for transmittal from said housing means, said electronic message means being responsive to said signal means; and*

*delay means responsive to said signal for deactivating said electromagnetic means after a pre-established delay interval.*

*40. The security system of claim 39 wherein said sensor means further comprises motion sensing means.*

*41. The security system of claim 39 wherein said sensor means further comprises presence sensing means.*

*42. The security system of claim 39 wherein said sensor means further comprises switch means.*

*43. The security system of claim 39 wherein said electronic message means produces information relating to the delay interval.*

*44. The security system of claim 39 and further comprising light emitting means mounted at said housing means for emitting a visible light during said delay interval.*

*45. The security system of claim 39 wherein said voice message is transmitted during said delay interval.*

*46. A door security system comprising:*

*housing means mounting electromagnet means activatable for generating a magnetic field;*

*armature means adapted for mounting to a door and attractable by said electromagnet means for magnetic bonding therewith;*

*circuit means disposed in said housing means comprising input means for receiving an input signal, said circuit means comprising electronic message means for generating a voice message for transmittal from said housing means, said electronic means being responsive to said input signal; and*

*release means responsive to said input signal for deactivating said electromagnetic means after a pre-established delay interval.*

*47. The security system of claim 46 further comprising sensor means for sensing motion and wherein said input signal is generated by said motion sensor means.*

*48. The security system of claim 46 and further comprising presence sensor means, and wherein said input signal is generated by said presence sensor means.*

*49. The security system of claim 46 and further comprising a panic bar and a switch actuatable by said bar, and wherein said input signal is responsive to said switch.*

*50. The security system of claim 46 wherein said electronic message means produces information relating to the delay interval.*

*51. The security system of claim 46 and further comprising light emitting means mounted at said housing means for emitting a visible light during said delay interval.*

*52. The security system of claim 46 wherein said voice message is transmitted during said delay interval.*

* * * * *